Nov. 25, 1969    J. H. KRESS ET AL    3,479,908
COMBINED VARIABLE-SPEED AND PLANETARY DRIVE
Original Filed April 6, 1966    3 Sheets-Sheet 1

INVENTORS
J. H. KRESS
D. F. LEMONS

INVENTORS
J. H. KRESS
D. F. LEMONS

*INVENTORS*
J. H. KRESS
D. F. LEMONS

United States Patent Office 3,479,908
Patented Nov. 25, 1969

3,479,908
COMBINED VARIABLE-SPEED AND
PLANETARY DRIVE
James Henry Kress and David Forrest Lemons, Cedar Falls, Iowa, assignors to Deere & Company, Moline, Ill., a corporation of Delaware
Continuation of application Ser. No. 540,602, Apr. 6, 1966. This application Aug. 14, 1968, Ser. No. 754,111
Int. Cl. F16h 37/06
U.S. Cl. 74—681    8 Claims

ABSTRACT OF THE DISCLOSURE

A transmission having a constant-speed input shaft driving the variable-diameter drive sheave of an infinitely-variable belt drive, the driven sheave of which drives a variable-speed shaft connected to the sun gear of a planetary gear train parallel to and generally between the constant-speed and variable-speed shafts. The gear train has one clutch engageable to directly connect the output to the variable-speed shaft and an alternately engageable clutch to connect the constant-speed shaft to one of the other planetary elements to provide a differential drive in the gear train.

---

This application is a continuation of applicants' copending application Ser. No. 540,602, filed Apr. 6, 1966, and now abandoned.

This invention relates to a vehicle transmission and more particularly to an improved combined infinitely-variable-speed and planetary drive for agricultural vehicles, such as tractors or the like.

It is known to control the speeds of two elements of a three-element planetary gear train to provide a wide variety of speeds in the third or output element, the input speed of one of the elements being provided by an infinitely-variable-drive to provide infinite speed variation within a limited range, while the planetary elements are selectively coupled to each other or to the input drives to provide different speed ranges. See, for example, assignee's U.S. Patent 3,251,243, issued May 17, 1966.

The primary object of the present invention is to provide an improved variable-speed and planetary drive of the type described above, having a novel, compact, efficient, and economical arrangement of parts. A more specific object is to provide such a drive having constant-speed and variable-speed input shafts for driving the planetary elements, the input shafts being parallel to and offset from one another and from the planetary axis, and driving the planetary elements through gear means. Another object is to provide a novel and efficient arrangement of the coupling means for selectively connecting the planetary elements to each other or to the input drives, and further to provide such coupling means in the form of friction clutches coaxial with the planetary elements. Still another object is to provide such a drive having alternate coupling means for selectively effecting the driving of the output directly from the variable-speed input shaft or in a planetary reduction range, wherein different elements of the planetary train are driven by the alternate input shafts.

These and other objects will become apparent from the following detailed description and accompanying drawings wherein.

Figure 1:
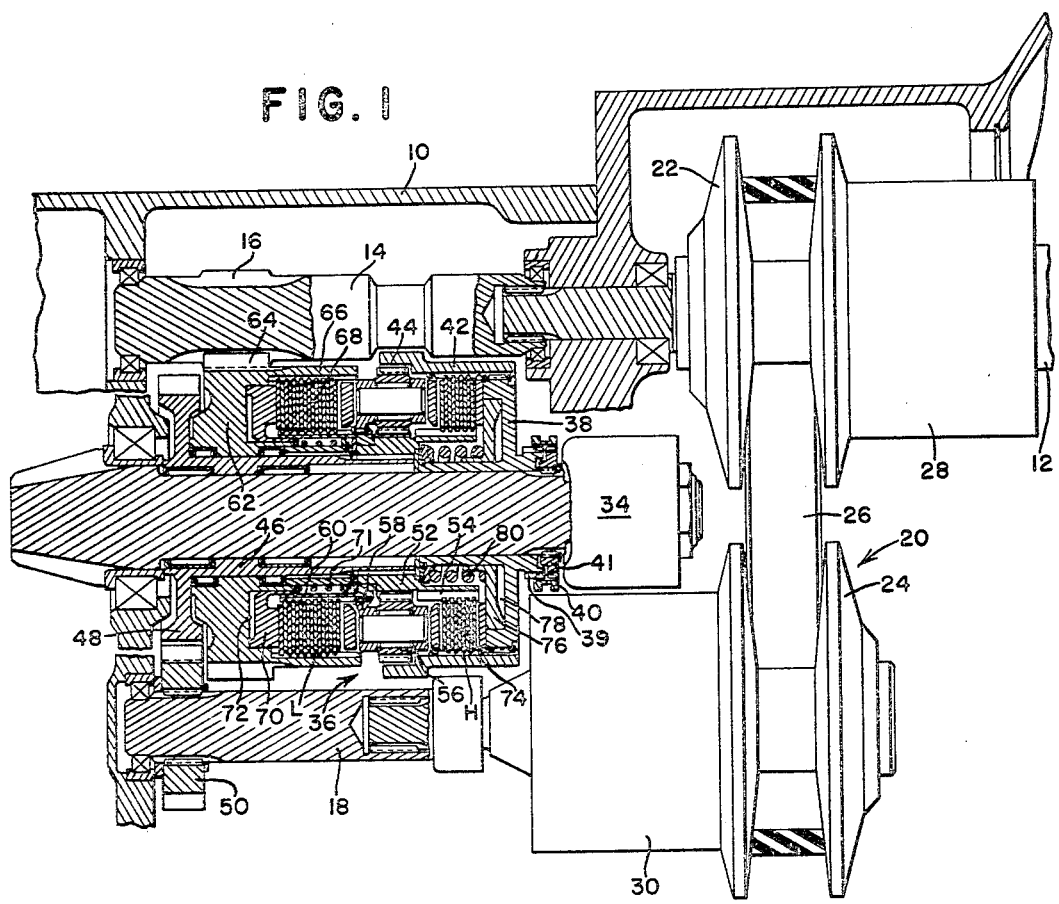
FIG. 1 is a longitudinal, primarily sectional view of the transmission, including fragmentary portions of the transmission housing.

The transmission shown in FIGS. 1–4 is carried in a housing 10, only portion of which is shown in FIG. 1, and is driven by a power source shaft 12, which, in a conventional tractor, extends rearwardly from and is driven by an internal combustion engine (not shown) governed to operate at a constant speed. Thus, the front of the tractor and the engine would be to the right in FIGS. 1 and 4. The above orientation, as well as the use of words such as "fore-and-aft," "forwardly," "rearwardly," "upwardly," or "downwardly," are for the purpose of clarity and are not to be construed as limiting the geography of the components. The shaft 12 is coaxially and drivingly connected to a housing-journaled constant-speed or engine-driven shaft 14, which includes a gear means 16 at its rearward end.

A variable-speed input shaft 18 is journaled in the housing 10, parallel to and below the constant-speed shaft 14, and is driven at variable speeds relative to the shafts 12 and 14 by a variable-speed drive means 20, including a variable-diameter drive sheave 22 coaxially affixed to the shaft 12, a variable-diameter driven sheave 24 coaxially affixed to the variable-speed shaft 18, and an endless driving element or belt 26 drivingly trained around the sheaves, the diameter of said sheaves being respectively established by coaxially associated control cylinders 28 and 30 in a known manner.

A rearwardly extending output shaft 34 is journaled in the housing 10, axially parallel to and generally between the constant-speed shaft 14 and the variable-speed input shaft 18 but slightly offset laterally from the vertical plane of the shafts 14 and 18. A planetary gear train 36 is mounted coaxially around the output shaft 34 and rearwardly of the variable-speed drive means 20. A radial member 38 including an externally splined hub portion 39 is normally drivingly connected to the forward end of the output shaft 34 by an internally splined collar 40 splined to both the hub portion 39 and an externally splined member 41, the collar 40 being selectively shiftable rearwardly on the hub portion 39 in a known manner to disengage the splined member 41, thereby disconnecting the output shaft 34 from the remainder of the transmission so that the vehicle may be towed, even at high speeds, without rotating the drive elements. The radial member 38 coaxially supports an internally splined drum 42 having at its rearward end a ring gear element 44 for the planetary gear train 36.

Rotatably mounted on the output shaft 34 is a hollow variable-speed input member 46, which includes a spur gear 48 at its rearward end meshing with and driven by a spur gear 50 affixed to the rear end of the variable-speed shaft 18. A planetary sun gear 52 is coaxially splined to the input member 46 just rearwardly of a coaxial external splined forward extension 54. The sun gear 52 and the ring gear 44 constantly mesh with a plurality of planetary pinions 56 journaled in a planetary carrier element 58, which includes an annular, rearwardly extending portion 60.

Coaxially journaled on the variable-speed input member 46 is a constant-speed input member 62, having external gear means 64 meshing with and driven by the gear 16 on the constant-speed shaft 14 and also having an internally splined forwardly extending annular portion 66. The constant-speed input member 62 is selectively connectible to and disconnectible from the carrier 58 by a low-range clutch means L including friction clutch plates 68 alternately splined to the carrier portion 60 and to the annular portion 66 of the constant-speed input member 62 and compressed into engagement by an annular piston 70 actuated against the clutch spring 71 by fluid pressure in an annular chamber 72 in a known manner. The drum 42 and the output shaft 34 connected thereto are similarly selectively connectible to and disconnectible from the sun gear 52 by a high-range clutch means H including a plurality of friction clutch plates 74 alternately splined to the sun gear shaft extension 54 and to the internally splined drum 42 and compressed into engagement by an annular piston 76 acting within the chamber 78 against the spring 80 in response to fluid pressure in said chamber, the fluid pressure again being established by conventional control means.

In operation, when the low-range clutch L is engaged and the high-range clutch H is disengaged, the planetary carrier 58 is connected to and driven by the constant-speed input member 62, and the planetary sun gear 52 is driven at a variable speed in the same direction. The speed and direction that the ring gear 44 is driven by the dual input depends on their relative speeds and the planetary and input gear ratios. For example, the ratio of the drive sheave diameter to the driven sheave diameter may be typically variable between .5 to 1 and 2.5 to 1, as graphically shown on the vertical scale in FIG. 3. When the ratio is at the maximum of 2.5 to 1, the variable-speed input shaft 18 is driven at two and one-half times the speed of the constant-speed input shaft 14, driving the sun gear at its maximum speed relative to the carrier 58. The gear ratios are such that when the sun gear is rotated at its maximum speed, the ring gear 44 is rotated in the opposite direction from the sun gear. In an agricultural vehicle, this produces a maximum reverse ground speed as shown in the horizontal scale in FIG. 3. As the sheave ratio is decreased, the speed of the sun gear 52 is reduced until its effect on the planetary train is balanced by the carrier speed, producing a zero output or ring gear speed. Further reduction of the sheave ratio, and consequently of the sun gear speed, results in rotation of the ring gear in the same direction as the sun gear and the carrier, producing a forward ground speed, the vehicle having a forward speed of 3.4 miles per hour at the minimum sheave ratio for the particular graphically illustrated installation.

Figure 3:
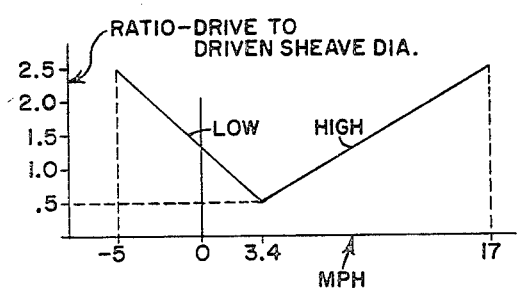
FIG. 3 is a graph of the speed vs. the variable-diameter sheave ratios in the alternate speed ranges.
Figure 4:
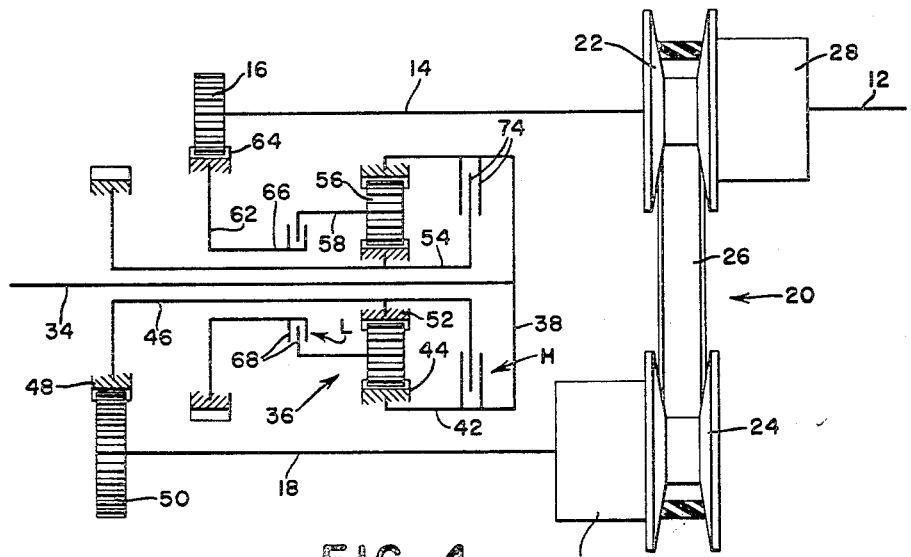
FIG. 4 is a schematic view of the transmission shown in FIG. 1.

At this point, the low clutch L is disengaged and the high clutch H is engaged, positively connecting the variable-speed input member 46 to the output shaft 34 through the members 38 and 42 and the clutch plates 74, whereby the speed of the output shaft 34 varies directly with the infinitely-variable speed of the variable-speed input member 46. The gear ratios are such that the speeds of the input members 46 and 62 are synchronous at the minimum .5 to 1 sheave ratio, and the minimum high range ground speed is thus identical to the maximum low-range forward ground speed as shown in FIG. 3. The shift between high and low range is thus smoothly achieved at the minimum sheave ratio by merely engaging and disengaging the high and low clutches without changing the sheave ratio. By adjusting the sheave ratio up to the 2.5 to 1 ratio, a forward ground speed of up to 17 miles per hour may be achieved in high range for the particular installation illustrated in FIG. 3.

Figure 2:
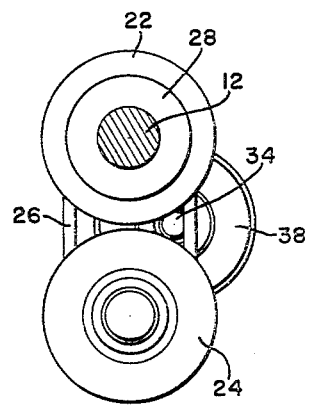
FIG. 2 is a reduced-scale end elevation of the transmission as viewed from the input end (from the right in FIG. 1).

As is apparent from FIGS. 1 and 2, the arrangement of components provides a compact transmission having particular advantage for use on an agricultural tractor or the like. The arrangement of the output shaft 34 coaxial with the planetary gear train 36 and offset from and between the constant-speed and variable-speed shafts 14 and 18 provides a transmission that is somewhat symmetrical about the axis of the output shaft 34, reducing the radial dimension of the transmission relative to the output axis, as well as permitting a reduction in the fore-and-aft length of the transmission.

Figure 5:
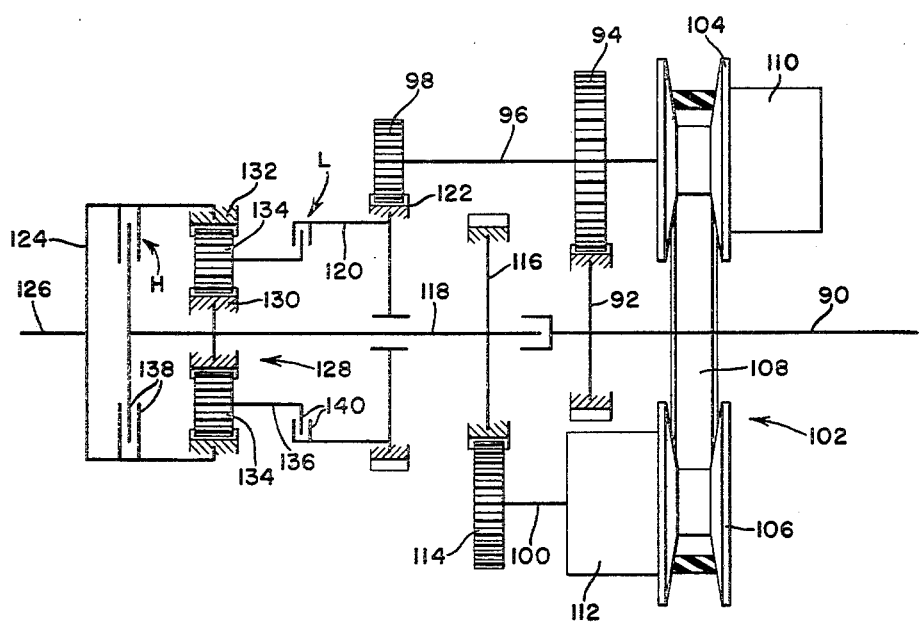
FIG. 5 is a schematic view, similar to FIG. 4, of a slightly different embodiment of the invention.

A slightly different arrangement of components is schematically shown in FIG. 5, wherein a fore-and-aft power source shaft 90 carries a spur gear 92 at its rearward end in mesh with a spur gear 94 affixed to an engine-driven or constant-speed shaft 96, which is parallel to and offset from the power shaft 90 and carries a constant-speed spur gear 98 at its rearward end.

A variable-speed shaft 100 is also parallel to and offset from the shaft 90 the same distance and in the opposite direction from the constant-speed shaft 96. The constant-speed shaft 96 and the variable-speed shaft 100 are connected by a variable-speed drive means 102 including a variable-speed drive sheave 104 coaxially affixed to the constant-speed shaft 96, a variable diameter driven sheave 106 coaxially affixed to the variable-speed shaft 100, and an endless belt or drive element 108. The diameters of the sheaves 104 and 106 are varied by conventional control cylinders 110 and 112. The variable-speed shaft 100 carries a spur gear 114 at its rearward end which drivingly meshes with a gear 116 coaxially affixed to a shaft-like variable speed input member 118, coaxial with and extending rearwardly from the power source shaft 90. A constant-speed input member 120 is coaxially journaled relative to the variable-speed input member 118 and is driven by the constant-speed gear 98 via a constant-speed input gear 122 coaxially affixed to the input member 120 rearwardly of the variable-speed input gear 116.

A rotatable output member 124, including an axial output shaft 126, is coaxial with and rearwardly from the variable-speed input member 118. Also coaxial with the output shaft 126 and the variable-speed input member 118 is a planetary gear train 128 including a sun gear 130 coaxially affixed to the variable-speed input member 118, a planetary ring gear 132 coaxially affixed to the output member 124 and planetary pinions 134 constantly meshing with the gun gear 130 and the ring gear 132 and rotatably carried by a planetary carrier 136. The output member 124 is selectively connectible to the variable-speed input member 118 by a high-clutch means H including clutch plates 138 alternately attached to the output member 124 and the variable-speed input member 118. The planetary carrier 136 is similarly selectively connectible to the constant-speed input member 120 by a low-range clutch means L including a plurality of clutch plates 140 alternately attached to the carrier 136 and the constant-speed input member 120.

The operation of this transmission is similar to the previously described transmission, the low-range clutch L being engaged and the high-range clutch H being disengaged to provide reverse and low-range speeds as shown in FIG. 3, and the high-range clutch being engaged and the low-range clutch being disengaged to provide the high-range speeds wherein the output member 124 is positively connected to and driven by the variable-speed input member 118. As is apparent form FIG. 5, the output shaft 126 and the power source shaft 90 are aligned and the shafts 96 and 100 are somewhat symmetrical relative to the shaft 90, providing a transmission with a compact radial dimension. The power shaft 90 extends between the runs of the belt 108, reducing the overall length of the transmission.

Figure 6:
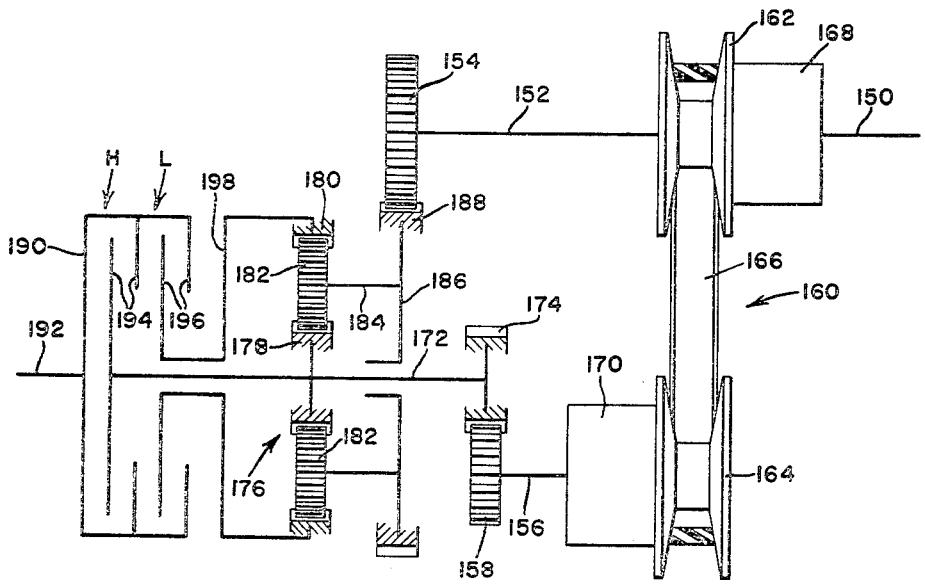
FIG. 6 is a schematic view, similar to FIG. 5, of still another embodiment of the invention.

Another embodiment of the invention is shown in FIG. 6 wherein the power source shaft 150 is coaxially affixed to the constant-speed or engine-driven shaft 152, which carries a spur gear 154 at its rearward end. A variable speed shaft 156, carrying a spur gear 158 at its rearward end, is parallel to and offset from the constant-speed shaft 152 and is driven at a variable speed relative to the constant-speed shaft through a variable-speed drive means 160 including a variable-diameter drive sheave 162 on the engine-driven shaft 152, a variable-diameter driven sheave 164 on the variable-speed shaft 156 and an endless belt or driving element 166, the diameters of the sheaves 162 and 164 being established by conventional control cylinders 168 and 170.

A variable-speed input member 172 is parallel to and offset between the shafts 152 and 156 and is driven by the variable-speed shaft 156 by means of the gear 158 and a gear 174 affixed to the forward end of the variable-speed member 172. A planetary gear train 176 is coaxially associated with the variable-speed input member 172 rearwardly of the gear 174 and includes a sun gear 178 coaxially affixed to the variable-speed input member, a ring gear 180, and a plurality of planetary pinions 182 constantly meshing with the sun gear 178 and ring gear 180 and rotatably carried by a planetary carrier element 184. The carrier element 184 is connected to and driven by a constant-speed input member 186, including a spur gear 188 coaxial with the planetary gear train and meshing with the spur gear 154 on the constant-speed shaft 152, whereby the carrier element 184 is driven at a constant speed and the sun gear element 178 is driven at a variable speed relative thereto.

An output member 190, including an axial shaft 192 coaxial with the planetary gear train 176, is rotatable rearwardly of the planetary gear train and is selectively connectible to the variable-speed input member 172 by a high-range clutch means H including clutch plates 194 alternately attached to the variable-speed input member 172 and the output member 190. The output member is similarly selectively connectible to the ring gear 180 via a low-range clutch means L including clutch plates 196 alternately attached to the output member 190 and an annular member 198 which extends rearwardly from the ring gear 180.

The operation of this transmission is again identical to the previously described transmission, the high and low clutches being selectively engaged and disengaged to establish the high and low driving ranges of the transmission. The high and low clutches are adjacent at the rearward end of the transmission and are thus readily accessible for ease in maintenance. The clutch means are disassociated from the plentary gear train 176 to simplify the manufacture and maintenance of the transmission. In addition, the constant-speed shaft 152 and variable-speed shaft 156 are offset on opposite sides of the planetary axis, providing a compact arrangement of components, the transmission having a relatively small radial dimension relative to the axis of the output shaft 192.

Other features and advantages of the present invention will readily occur to those skilled in the art, as will many modifications and alterations in the preferred embodiments of the invention described herein, all of which may be achieved without departing from the spirit and the scope of the invention.

What is claimed is:

1. A transmission comprising: an engine-driven shaft; a variable-speed drive shaft parallel to and offset from the engine-driven shaft; a variable-speed drive means operatively interconnecting the variable-speed drive shaft and the engine-driven shaft to drive the variable-speed drive shaft at a variable speed relative to the engine-driven shaft; a planetary gear train axially parallel to and generally between the variable-speed drive shaft and the engine-driven shaft and including first, second, and third coaxial elements and planetary pinion means carried by one element and meshing with the other two; a first rotatable input member axially parallel and drivingly connected to the variable-speed drive shaft and coaxially drivingly connected to the first planetary element; a second input member coaxially journaled relative to the first input member and connected to and driven by the engine-driven shaft; an output member coaxially journaled relative to the input members; a first clutch means coaxial with the output member and selectively engageable and disengageable to drivingly connect and disconnect the first input member and the output member; a first connecting means for drivingly connecting the second input member to said second planetary element; a second connecting means for drivingly connecting the third planetary element to said output member, at least one of said connecting means including a second clutch means selectively engageable and disengageable to render said one connecting means opertive or inoperative; an output shaft coaxially journaled relative to the output member; and a third clutch means between the output member and the output shaft for selectively drivingly connecting the member to the output shaft.

2. The invention defined in claim 1 wherein the first connecting means includes said second clutch means, the second clutch means including a plurality of adjacent annular friction plates alternately connected to the second input member and the second planetary element and engageable to drivingly connect said second input member to the second planetary element.

3. The invention defined in claim 1 wherein the second connecting means includes said second clutch means which includes a plurality of adjacent annular friction plates alternately connected to the third planetary element and the output member and engageable to drivingly connect said element to the output member.

4. The invention defined in claim 1 wherein the second planetary element is a planetary carrier and the first clutch means is operative between the first and third planetary elements and engageable to lock said elements for rotation in unison.

5. The invention defined in claim 1 wherein the first and second clutch means are friction clutches including a plurality of annular coaxially adjacent friction clutches, and are coaxially and adjacently disposed on the same side of the planetry gear train.

6. A vehicle transmission comprising: an engine-driven shaft; a variable-speed shaft offset from and parallel to the engine-driven shaft; an infinitely-variable-speed drive means drivingly connecting the engine-driven shaft to the variable-speed shaft to drive the variable-speed shaft at infinitely variable speeds relative to the engine-driven shaft; an output shaft parallel to and generally between the engine-driven and variable-speed shafts; a planetary gear train coaxially disposed on the output shaft and including a planetary sun gear, a planetary ring gear, a planetary carrier, and planetary pinion means carried by the carrier and constantly meshing with the sun and ring gears; a first input member coaxially journaled on the output shaft and drivingly connected to the sun gear; a first spur gear means drivingly connecting the variable-speed shaft to the first input member; a second input member coaxially disposed on the output shaft and rotatable relative thereto; a second spur gear means drivingly connecting the engine-driven shaft to the second input member; means for drivingly connecting the ring gear to the output shaft; a first clutch means engageable to drivingly connect the ring gear to the sun gear and including a plurality of annular friction plates alternately connected to the sun and ring gears and hydraulic motor means actuatable to press the friction plates into engagement; and a second clutch means engageable to drivingly connected the second input member to the planetary carrier and including a plurality of annular friction plates alternately connected to the second input member and the planetary carrier and hydraulic motor means actuatable to press said friction plates into engagement.

7. The invention defined in claim 6 wherein the second input member is adjacent to and coaxially journaled on the first input member.

8. The invention defined in claim 7 wherein the first and second spur gear means respectively include a spur gear coaxially disposed relative to the output shaft axially adjacent one another.

(References on following page)

References Cited

UNITED STATES PATENTS

| | | |
|---|---|---|
| 1,702,627 | 2/1929 | Bronander. |
| 2,330,397 | 9/1943 | Trofimov. |
| 2,865,230 | 12/1958 | Simpson _____ 74—759 |
| 2,933,952 | 4/1960 | Schou. |
| 3,091,132 | 5/1963 | Mayfield et al. |
| 3,122,025 | 2/1964 | Mark et al. |
| 3,251,243 | 5/1966 | Kress. |
| 3,270,588 | 9/1966 | Bowen et al. |
| 3,340,749 | 9/1967 | Magg et al. |
| 3,375,733 | 4/1968 | Browning _____ 74—689 |

FOREIGN PATENTS

| | | |
|---|---|---|
| 1,185,883 | 1/1965 | Germany. |

DONLEY J. STOCKING, Primary Examiner

THOMAS C. PERRY, Assistant Examiner

U.S. Cl. X.R.

74—689